United States Patent
Choi et al.

(10) Patent No.: US 8,238,672 B2
(45) Date of Patent: Aug. 7, 2012

(54) APPARATUS AND METHOD FOR AUTOMATIC VIDEO SUMMARIZATION USING FUZZY ONE-CLASS SUPPORT VECTOR MACHINES

(75) Inventors: Young-Sik Choi, Goyang (KR); Sang-Youn Lee, Seoul (KR); Sun-Jeong Kim, Seoul (KR)

(73) Assignee: KT Corporation, Gyeonggi-do (KR)

( * ) Notice: Subject to any disclaimer, the term of this patent is extended or adjusted under 35 U.S.C. 154(b) by 1704 days.

(21) Appl. No.: 10/562,606

(22) PCT Filed: Jun. 28, 2004

(86) PCT No.: PCT/KR2004/001568
§ 371 (c)(1),
(2), (4) Date: Sep. 1, 2006

(87) PCT Pub. No.: WO2005/001838
PCT Pub. Date: Jan. 6, 2005

(65) Prior Publication Data
US 2007/0046669 A1    Mar. 1, 2007

(30) Foreign Application Priority Data
Jun. 27, 2003   (KR) .................. 10-2003-0042613

(51) Int. Cl.
*G06K 9/62* (2006.01)
*G06T 11/20* (2006.01)
(52) U.S. Cl. ....................................... 382/225; 345/440
(58) Field of Classification Search .................. 382/225; 345/440
See application file for complete search history.

(56) References Cited

U.S. PATENT DOCUMENTS

| 5,664,227 A | 9/1997 | Mauldin et al. ............... 395/778 |
| 6,331,859 B1 * | 12/2001 | Crinon .......................... 345/619 |
| 6,535,639 B1 * | 3/2003 | Uchihachi et al. ............ 382/225 |
| 7,069,259 B2 * | 6/2006 | Horvitz et al. ................. 706/25 |
| 2002/0051010 A1 | 5/2002 | Jun et al. ....................... 345/723 |
| 2002/0083471 A1 | 6/2002 | Agnihotri et al. ............. 725/137 |
| 2004/0002932 A1 * | 1/2004 | Horvitz et al. ................. 706/46 |

(Continued)

FOREIGN PATENT DOCUMENTS
JP        11-073406         3/1999
(Continued)

OTHER PUBLICATIONS

Choi et al, "Video Summarization Using Fuzzy One-Class Support Machine", Computational Science and Its Applications—ICCSA, Lecture Notes in Computer Science, 2004, vol. 3043/2004, pp. 49-56.*

(Continued)

*Primary Examiner* — David Czekaj
*Assistant Examiner* — Chikaodili E Anyikire
(74) *Attorney, Agent, or Firm* — IP Legal Services, LLC (57) ABSTRACT

Disclosed is an automatic video summarization device and method using a fuzzy OC-SVM (one-class support vector machine) algorithm. A user's subjective decision is reflected in order to generate an effective video summary, and a method for generating flexible video summary information which satisfies the user's environment or requirements is provided. Important video segments are extracted from a given video, and a sequence of key frames is extracted from the video segments, and hence, the user can catch the contents of the video quickly and access desired video scenes.

8 Claims, 5 Drawing Sheets

U.S. PATENT DOCUMENTS

| | | | |
|---|---|---|---|
| 2004/0088723 A1* | 5/2004 | Ma et al. | 725/19 |
| 2005/0159956 A1* | 7/2005 | Rui et al. | 704/275 |
| 2005/0185846 A1* | 8/2005 | Luo et al. | 382/224 |
| 2005/0251406 A1* | 11/2005 | Bolt et al. | 705/1 |

FOREIGN PATENT DOCUMENTS

| | | |
|---|---|---|
| JP | 2002-251197 A | 9/2002 |

OTHER PUBLICATIONS

Gretton, A., On-Line one-class support vector machines. An application to signal segmentation, 2003 IEEE International Conference on Acoustics, Speech, and Signal Processing, Apr. 2003, vol. 2, p. 709-712.

Hashimoto, T., et al., "Digested TV Program Viewing Application Using Program Index" vol. 23. 1999. 3. 23. No. 28, p. 7-12.

Ratsch G., Constructing boosting algorithms from SVMs: an application to one-class classification, IEEE Transactions on Pattern Analysis and Machine Intelligence, Sep. 2000, vol. 24, p. 1184-1199.

YongSik Choi, et al., "Scalable Keyframe Extraction Using One-Class Support Vector Machine", Lecture Notes in Computer Science, vol. 2660, Jun. 18, 2003, pp. 491-499.

Takako Hashimoto, et al., "Digested TV Program Viewing Application Using Program Index", ITE Technical Report, vol. 23, No. 28, Mar. 24, 1999, pp. 7-12. (Japanese language, English abstract included).

Takuya Inoue et al., "Architecture of Fuzzy Support Vector Machines for Pattern Classification", Transactions of the Institute of Systems, Control and Information Engineers, Feb. 15, 2002, pp. 92-98, vol. 15, No. 2.

* cited by examiner

APPARATUS AND METHOD FOR AUTOMATIC VIDEO SUMMARIZATION USING FUZZY ONE-CLASS SUPPORT VECTOR MACHINES

TECHNICAL FIELD

The present invention relates to a video summarization technique.

More specifically, the present invention relates to an automatic video summarization device and method using fuzzy one-class class support vector machines.

BACKGROUND ART

As various moving pictures have been provided because of increases of large volumes of multimedia databases and developments of communication and digital media processing techniques, attempts to increase users' convenience and satisfaction through search services on the basis of summary information of abridged video have been executed. However, most video has been currently abridged by sorting and extracting appropriate scenes or images by a person's direct handling.

Demands of automatically analyzing a large amount of video have increased as various categories of business which relate to the video have been progressed, and accordingly, many studies for solving the above-noted problem have been actively proposed.

Video abridging methods are classified as video skimming, highlighting, and video summarization.

The video skimming scheme is a method for consecutively connecting parts which have important meaning extracted from video and audio data, and generating a short video synopsis. The highlight scheme is a method for sorting interesting parts from the video on the basis of predetermined events, and abridging them. The video summary is to sort out meaningful contents and structural information from the video. Video summary results are generally represented in a sequence of key frames (still images), and the studies on video abridgement aim at generating video summary information.

The video summary represented by the key frames allows a user to understand the whole video contents at a glance, and functions as an entry of the scenes or shots which have the corresponding key frames. Hence, the video summary task is also a task for selecting the optimal key frame or a task for selecting a segment at which the optimal key frame is located, and visual characteristics such as color and motion are used as important factors for selecting key frames.

The video summary is divided into shot-based summary and segment-based summary according to its application range.

The shot-based summary is a method for displaying short videos, that is, video clips with several key frames, and the segment-based summary is a skill for abridging the whole long video.

More studies have recently focused on the segment-based summary, because of the wider application ranges of the segment-based abridgment techniques. The disclosed invention also aims at the segment-based summary.

Methods for abridging divided video per segment include (a) a shot grouping method for analyzing the correlation between shots in the temporal window and grouping the shots with a high relation into a story unit (or a scene), and (b) a method for analyzing the characteristics of clusters obtained by conventional clustering and selecting important clusters.

These methods can further be fractionized depending on the case in which what visual characteristics are used or which shot is selected as a representative.

An important problem that the above-mentioned methods have in common is that the decision of representative excessively depends on threshold values. That is, the representative of shots is determined based on the established specific threshold value. For example, shots the importance of which is greater than the threshold value or those the importance of which is within the top 10% of priority are selected. The threshold values are experimentally determined. The problem that is caused from the video abridgment algorithms by severely depending on the experimental threshold values is that the video abridgment system can be very effective to some specific video but it is difficult to be applied to various types of video.

Also, this problem can be a fatal defect in the application fields of processing various categories of video information, and the task of setting the optimized threshold value experimentally requires a large cost.

Subjective decisions based on human decisions as well as the visual features may operate as important factors as to selecting the key frame for video summary.

When the user actually abridges the video manually, he can create a video summary that can move other people's hearts by introducing the subjective decision. Therefore, a study for applying the subjective decision to the video abridging process is needed in order to generate an effective video summary.

In addition, it is necessary to generate scalable video summary information in consideration of the user's environment in order to generate more effective video summary.

DISCLOSURE

Technical Problem

It is an advantage of the present invention to provide a video summary generating technique for a user to understand video contents and access desired video scenes by extracting important video segments from a given video, and extracting a sequence of key frames from the video segments.

Technical Solution

In one aspect of the present invention, an automatic video summarizer comprises: an input unit for receiving a video source to be summarized and a desired summarization time from a user; an importance measurement module for generating importance degrees according to category characteristics of the video and a purpose of desired summary; and a video summarization generation module for applying shot information and an importance value to a characteristic support vector algorithm, and generating a video summary.

The characteristic support vector algorithm is the OC-SVM (one-class support vector machine) algorithm, and further the fuzzy OC-SVM algorithm.

The automatic video summarizer further comprises a shot detection module for extracting the video sources for respective shots.

The automatic video summarizer comprises: an output unit for outputting the generated video summary to a screen; and a storage unit for storing the generated video summary.

The video summary generation module comprises: a characteristic support vector module for applying the shot information and the importance value to the characteristic support vector algorithm, and generating a video summary; and a scalability processing module for receiving the summarization time information from the user, repeatedly performing a scalability process, and generating a video summary having a time range desired by the user.

The shot detection module detects a shot from the video source to be summarized, configures a shot list, and transmits the shot list to the video summarization generation module.

In another aspect of the present invention, an automatic video summarization method comprises: (a) receiving a video source to be summarized and a desired summarization time from a user; (b) extracting the video source for each shot; (c) generating importance degrees according to the video's category characteristic and a purpose of desired summary; and (d) applying shot information and an importance value to a characteristic support vector algorithm, and generating a video summary.

In still another aspect of the present invention, an automatic video summarization method comprises: (a) receiving a video source to be summarized and a desired summarization time from a user; (b) generating importance degrees according to the video's category characteristic and a purpose of desired summary; (c) applying shot information and an importance value to a characteristic support vector algorithm, and generating a video summary; (d) outputting the generated video summary to a screen; and (e) storing the generated video summary.

In still yet another aspect of the present invention, a recording medium storing a program for an automatic video summarization method, comprises: receiving a video source to be summarized and a desired summarization time from a user; extracting the video source for each shot; generating importance degrees according to the video's category characteristic and a purpose of desired summary; and applying shot information and an importance value to a characteristic support vector algorithm, and generating a video summary.

Advantageous Effects

A search engine provides summary information of web pages when the user searches web documents in order to reduce the information finding time by allowing the user to guess the contents without visiting all the searched result sites.

In a like manner thereof, the fundamental purpose of video summarization is to allow the user to know the contents without watching the whole video and maximize the efficiency of information access. The technique for automatically generating the video summary becomes more important than the text summarization technique when considering the amounts of video information.

Further, the video summarization skill which transmits important information with a lesser amount of data will be used as the core of the mobile video contents industry in the radio environment with restricted bandwidths.

DESCRIPTION OF DRAWINGS

The accompanying drawings, which are incorporated in and constitute a part of the specification, illustrate an embodiment of the invention, and, together with the description, serve to explain the principles of the invention, wherein.

BEST MODE

The present invention will be started from the concept of analyzing video summary as a novelty detection problem, digressing from the threshold value depending methods. That is, a frame the visual feature of which is distinguished from those of other frames is defined to be the representative frame of the given video.

The OC-SVM (one class-support vector machine) provides excellent performance for the novelty detection problem. The SVM is originated from a learning method based on a statistical learning theory, which uses labeled data to allow a machine to learn and deduce a correct answer when new data which are not labeled arrive.

Differing from the conventional learning methods, the SVM minimizes the structural risk, uses a method for finding the optimal decision boundary region in the vector space, and provides good results in the binary classification problems such as pattern recognition. Among them, the OC-SVM targets on the data of the labeled positive class, that is, the data which express the object best between the positive class and the negative class on the basis of the decision boundary region of the SVM. For example, a user is interested in a very small amount of data from among the total searched data in the case of a text or image search. What is important in this instance is not the total data but some positive samples.

The OC-SVM does not predict distribution of given data, but predicts the optimized support vectors which describe the given data the best.

The OC-SVM efficiently detects key frames having unique characteristics from among a plurality of video frames, since it is useful to find unique characteristic vectors in the general characteristic vector space.

However, there are some restrictions in obtaining a desired video summary through the OC-SVM. Since the OC-SVM targets the support vectors to which visual characteristics are applied, it is difficult to apply subjective elements to be decided by the user (e.g., an element in which a long shot rather than a short shot may be given a more important meaning and an element in which it is better to generate summary information excluding the segment which includes a news anchorman, and even though the characteristic vectors for applying the above-noted elements are defined, it is needed to combine the characteristic vectors with the conventional visual characteristic vectors.

In the present invention, the user's subjective elements are applied through definition on the membership function of the fuzzy theory, and the total support vectors are found through the fuzzy OC-SVM combined with statistical characteristic vectors.

The fuzzy OC-SVM can generate scalable video summary which is flexible in consideration of the user's environment by using the property of finding a minimum sphere which surrounds given data. That is, in the fuzzy OC-SVM, the most outward surface vector is extracted and generated to be the top summary. The surface is peeled off, a sphere which surrounds the current data is found, and a detailed video summary is generated by combining this vector with the previous vector set. A scalable video summary can be generated by appropriately repeating this process according to the user's environment, and the scalability is applicable to a layered clustering algorithm. The number of vectors used for each level is optimally found in the preferred embodiment, and the scaling task is performed according to the clustering conditions in the layered clustering algorithm differing from the preferred embodiment.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 1:
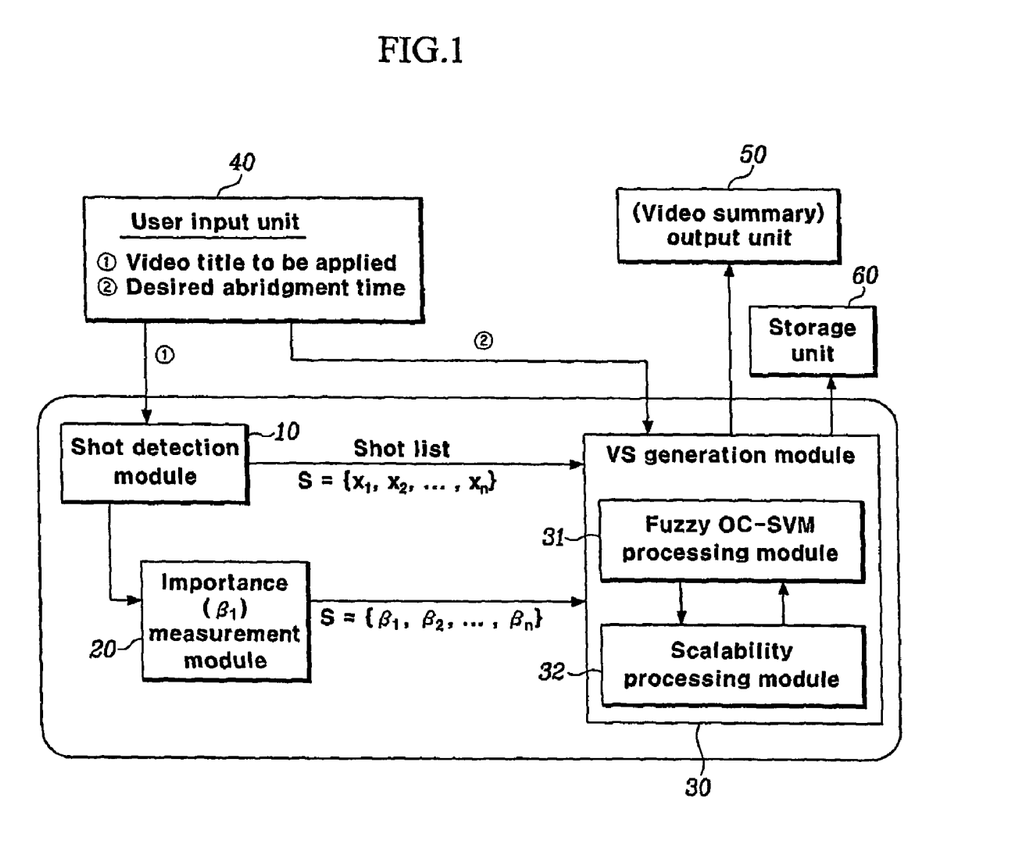
FIG. 1 shows an automatic video summarizer using a fuzzy OC-SVM according to a preferred embodiment of the present invention.

FIG. 1 shows an automatic video summarizer using a fuzzy OC-SVM according to a preferred embodiment of the present invention.

Referring to FIG. 1, the automatic video summarizer comprises an input unit 40, a shot detection module 10, an importance measurement module 20, a video summary generation module 30, a storage unit 60, and an output unit 50. The input unit 40 receives two kinds of information including (1) a video source to be summarized and (2) a desired summary time from the user. The shot detection module 10 divides the whole video into shots, which is a precedent task for summarizing the video such as a movie in the segment level. The case of targeting short video such as video clips may require no shot detection module 10. The shot detection module 10 extracts shots from the video source to be summarized of (1) to configure a shot list, and transmits the shot list to the video summary generation module 30. The importance measurement module 20 generates importance degrees of $\beta_j$ according to category characteristics of the video or purposes of the desired summary, which is performed in various ways depending on the targets, such as the user's manual data inputting or retrieving data from a database. The video summary generation module 30 applies the fuzzy OC-SVM algorithm to shot information and an importance value and generates a VS (video summary), and determines whether to process scalability based on the summary time information input by the user. When needed, the video summary generation module 30 repeats an operation of a scalability processing module 32 and generates a video summary having a time range desired by the user. The output unit 50 outputs the generated video summary to a screen, and the storage unit 60 stores corresponding information.

An operation of the automatic video summarizer using the fuzzy OC-SVM according to the preferred embodiment of the present invention will be described.

Figure 2:
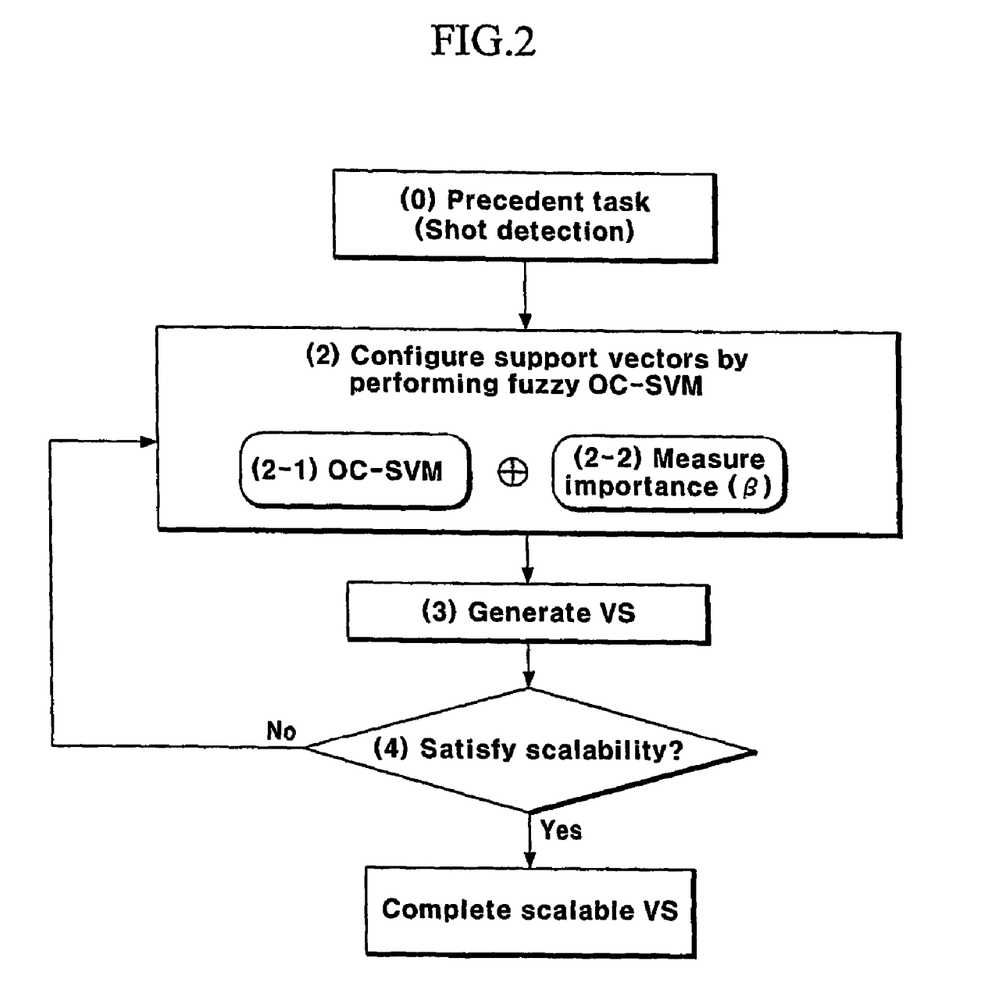
FIG. 2 shows an operational flowchart of an automatic video summarizer using a fuzzy OC-SVM according to a preferred embodiment of the present invention.

FIG. 2 shows an operational flowchart of an automatic video summarizer using a fuzzy OC-SVM according to the preferred embodiment of the present invention, describing the whole process for performing a summarization task by applying a fuzzy OC-SVM based automatic video summarizing scheme.

The operation for each task will be described in detail with reference to FIG. 2.

(0) Precedent Task

A task prior to video summarization is to analyze a sequence of video frames and extract them for each shot by the shot detection module 10. In detail, the task is to extract visual characteristics from patterned individual frame images which form video contents, compare similarity between the respective frames based on the extracted visual characteristics, and divide the frames into shots which display continuous motion temporally and spatially. However, the conventional HAC (hierarchical agglomerative clustering) or K-means clustering method is also used starting from the frames without dividing the video since the above-described shot boundary detection is incomplete. The subsequent summarization task is based on a sequence of divided segments.

(1) Measuring Importance Degrees

The importance measurement module 20 measures the importance degrees which are defined in various manners according to the user by applying the user's subjective point of view on the video segments. The importance degree of $\beta_j$ represents importance for the corresponding segment, and its range is given as $\beta \in (0, 1)$, which will be described for better clarification through some examples.

(1-1) Case of Considering the Length of a Segment

When a mean length of video segments is given to be m, and a standard deviation is given to be $\sigma$, the importance of the segment is expressed in Math Figure 1.

$$\beta_j = 0.5\left[\frac{(\text{duration} - m)}{3\sigma} + 1\right] \qquad \text{[Math Figure 1]}$$

where a duration is a length of the jth segment. When $\beta_j$ is less than or equal to 0, it is controlled to be a very much lesser value (e.g., 0.001), and when $\beta_j$ is greater than 1, it is controlled to be 1.

(1-2) Case of Designating Segments According to the User's Preference

For example, the importance is determined as given in Math Figure 2 when the user designates a specific segment from the video segments, or when the user designates a pre-stored video segment from another video source and does not desire that the segment corresponding to the designated segment is included in the video summary.

$$\beta_j = 1 - sim(x_j, u) \qquad \text{[Math Figure 2]}$$

where sim(x, y) is similarity between two segments given as characteristic vectors x and y, and u is a characteristic vector of the segment designated by the user.

Figure 3:
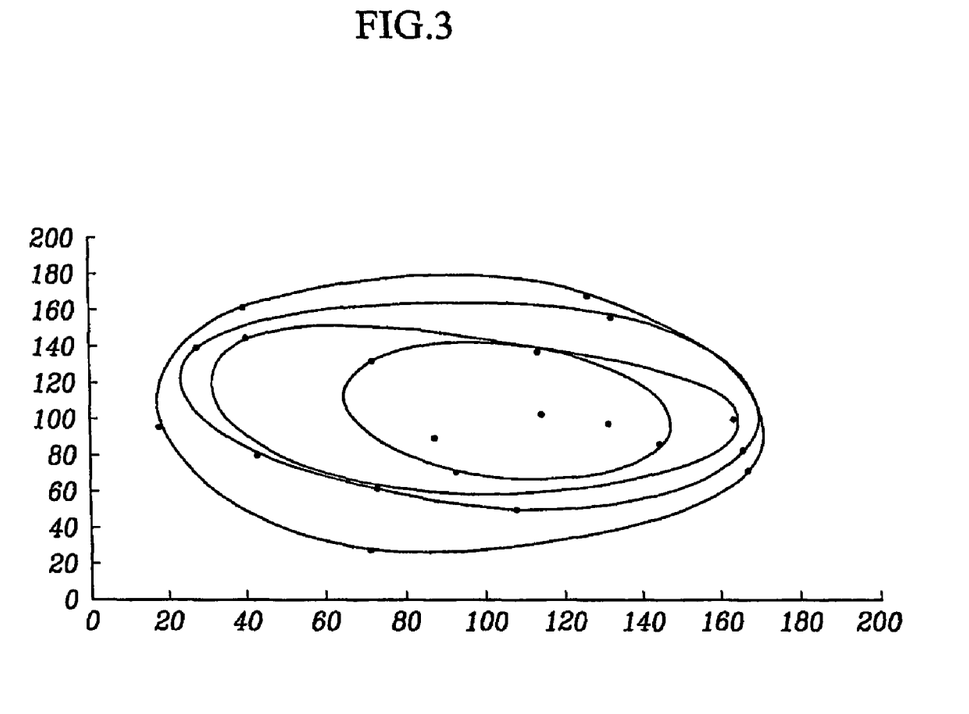
FIG. 3 shows a conceptual diagram for scalable novelty detection applicable to generation of scalable summary information.

(2) Fuzzy One-Class Support Vector Machine Algorithm (2-1) Conventional OC-SVM Algorithm The OC-SVM algorithm will now be described. A data set of S which includes n data points {xj, j=1, . . . , n} from among the data points which represent visual characteristic vectors is assumed, and a feature map $\phi$ for mapping the data points in a feature space is defined to be $\phi(x_j)$. In this feature map space, a dot product is defined in Math Figure 3.

$$\Phi(x_i) \cdot \Phi(x_j) = K(x_i, x_j) \qquad \text{[Math Figure 3]}$$

where K(xi, xj) uses various functions and here uses the Gaussian kernel function for ease of description. Hence, it is given that $K(x_i, x_j) = \exp(-0.5\|x_i - x_j\|^2/\sigma^2)$.

Figure 4:
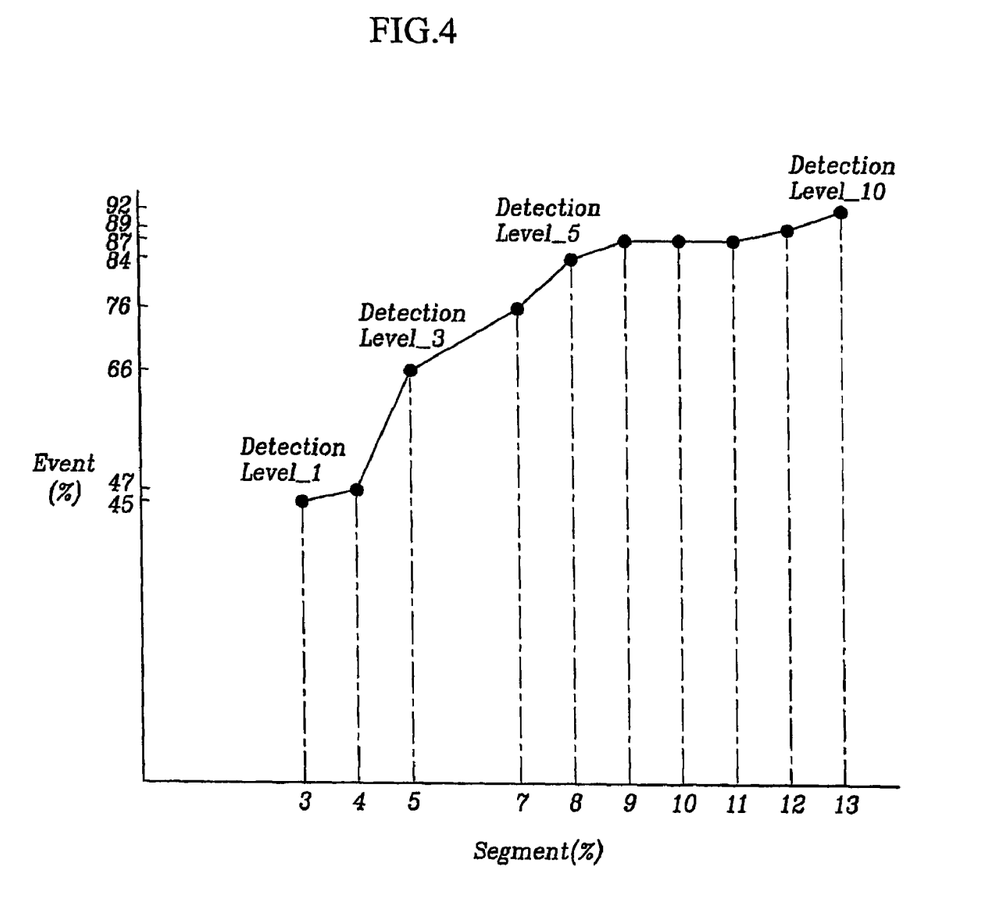
FIGS. 4 and 5 show experimental results of a movie and a music video, illustrating the ratio of important segments increased according to repeated extraction of important segments (with respect to the total segments), and the ratio of the segments' covering the whole video events.

The OC-SVM aims at minimizing the subsequent objective function. That is, it finds the minimum sphere including the feature vectors $\phi(x_j)$.

$$R^2 + C\Sigma\xi_j, \; \|\phi(x_j) - \alpha\|^2 \leq R^2 + \xi_j \text{ and } \xi_j \geq 0 \; \forall j \qquad \text{[Math Figure 4]}$$

Figure 5:
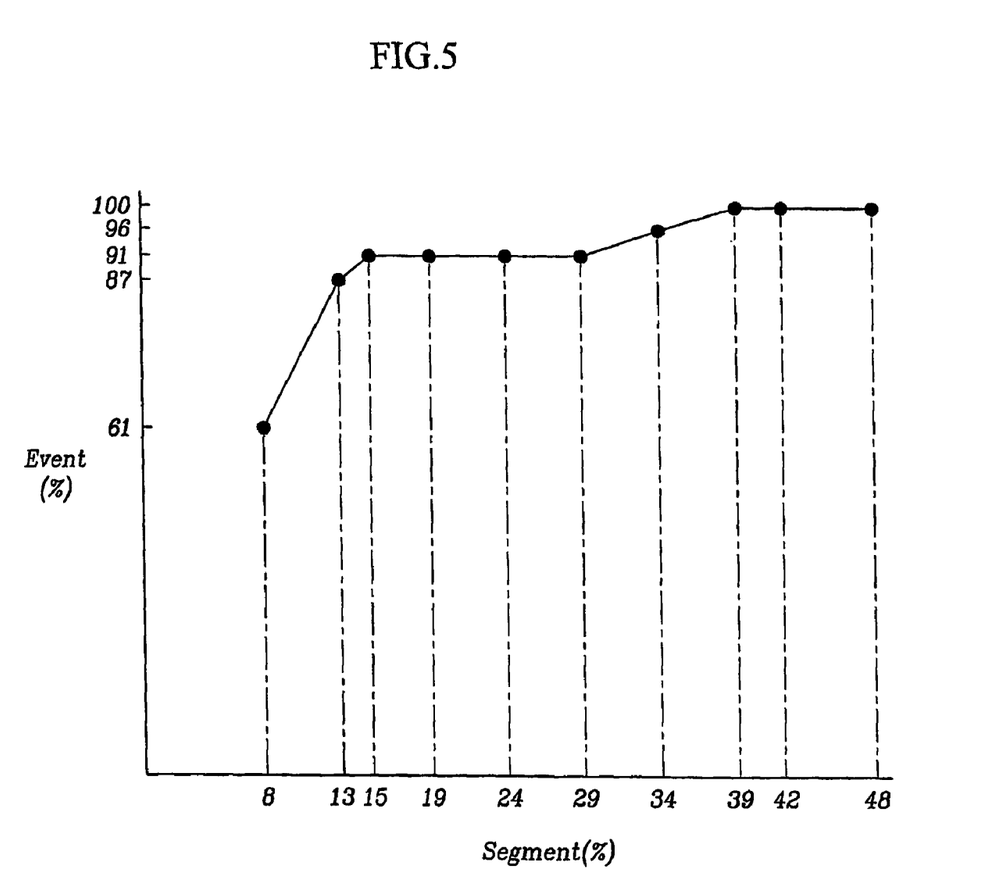

When the Lagrangian multiplier ($\alpha_j \geq 0$ and $\mu_j \geq 0$) is introduced, Math Figure 4 is expressed with respect to L.

$$L = R^2 - \sum_j (R^2 + \xi_j - \|\phi(x_j) - a\|^2)\alpha_j - \sum_j \xi_j \mu_j + C\sum_j \xi_j \quad \text{[Math Figure 5]}$$

The dual problem is obtained when the L differentiated with respect to R, a, and $\xi_j$ is given to be 0.

Maximize $W = \Sigma_j \phi(x_i) \cdot \phi(x_j)\alpha_j - \Sigma_{i,j}\alpha_i\alpha_j\phi(x_i)\cdot\phi(x_j) = \Sigma_j \alpha_j K(x_j, x_j) - \Sigma_{i,j}\alpha_i\alpha_j K(x_i, x_j)$ [Math Figure 6]

where it is to be satisfied that $0 \leq \alpha_j \leq C$, $\Sigma_j \alpha_j = 1$, and $a = \Sigma_j \alpha_j \phi(x_j)$. In this instance, the radius R of the minimum sphere is found as Math Figure 8 by using the KKT condition given in Math Figure 7.

$\xi_j\mu_j = 0$, $(R^2 + \xi_j - \|\phi(x_j) - a\|^2)\alpha_j = 0$ [Math Figure 7]

$R^2 = \|\phi(x) - a\|^2 = K(x, x) - 2\Sigma_i\alpha_i K(x, x_i) + \Sigma_{i,j}\alpha_i\alpha_j K(x_i, x_j)$ [Math Figure 8]

where x is a support vector. The value of a is found by general quadratic programming given in Math Figure 6. When the value of a obtained from the quadratic programming is found to be greater than 0, a corresponding characteristic vector x is referred to as a support vector.

(2-2) Fuzzy OC-SVM Algorithm

The minimum sphere is found in the fuzzy OC-SVM algorithm combined with the importance of (1) compared to the OC-SVM algorithm of (2-1).

A data set of $S = \{(x_1, \beta_1), (x_2, \beta_2), \ldots, (x_n, \beta_n), (x_i, \beta_i)\}$ is assumed where a data point xi is a visual characteristic vector obtained from the segment, and importance $\beta_i$ represents importance for the corresponding segment. The result of applying the fuzzy feature map to the set S becomes $\{\beta_1\phi(x_1), \ldots, \beta_j\phi(x_j), \ldots, \beta_n\phi(x_n)\}$, and the importance is combined with the math figures applied by the OC-SVM of (2-1) as follows.

$\Phi(\beta_i, x_i) \cdot \Phi(\beta_j, x_j) = \beta_i\beta_j K(x_i, x_j)$, $\|\beta_j\phi(x_j) - a\|^2 \leq R^2 + \xi_j$ and $\xi_j \geq 0 \, \forall j$ [Math Figure 9]

Math Figure 10 is given when the Lagrangian multiplier ($\alpha_j \geq 0$ and $\mu_j \geq 0$) is introduced to Math Figure 9 and Math Figure 9 is expressed with respect to L.

$$L = R^2 - \sum_j (R^2 + \xi_j - \|\beta_j\phi(x_j) - a\|^2)\alpha_j - \sum_j \xi_j\mu_j + C\sum_j \xi_j \quad \text{[Math Figure 10]}$$

The dual problem is to satisfy Math Figure 11 by using the result of differentiated L.

maximize $W = W = \Sigma_j\alpha_j\beta_j^2 K(x_j, x_j) - \Sigma_{i,j}\alpha_i\alpha_j\beta_i\beta_j K(x_i, x_j)$ [Math Figure 11]

Also, the KKT condition is given in Equation 12.

$(R^2 + \xi_j - \|\beta_j\phi(x_j) - a\|^2)\alpha_j = 0$ [Math Figure 12]

When the fuzzy OC-SVM is applied through the above-described processes, the radius R of the minimum sphere is found in Math Figure 13.

$R^2 = \|\beta\phi(x) - a\|^2 = \beta^2 K(x, x) - 2\beta\Sigma_i\alpha_i\beta_i K(x, x_i) + \Sigma_{i,j}\alpha_i\alpha_j\beta_i\beta_j K(x_i, x_j)$ [Math Figure 13]

where x is a support vector, and $\beta$ is importance of the corresponding support vector x.

(3) Applying to Video Summary

The number of support vectors can be controlled by controlling the constant C in Math Figure 11 of the fuzzy OC-SVM algorithm. When it is given that C=1, the OC-SVM finds the minimum sphere including the characteristic vectors since it allows no outlier. Accordingly, the value of C is assumed to be 1 in order to find the minimum sphere including the characteristic vectors in the video summarization, and the found minimum sphere is represented by a central vector of a and a radius of R of the sphere. In this instance, the support vectors which are characteristic vectors on the vector of a having the value greater than 0 are provided on the surface of the sphere. The OC-SVM module 31 extracts key frames from the segments of the characteristic vectors provided on the surface, and uses them for video summarization.

(4) Scalable Video Summarization

The target of the fuzzy OC-SVM, that is, to find the minimum sphere, is used, which is shown in FIG. 3.

Referring to FIG. 3, the OC-SVM module 31 collects the support vectors provided on the first surface and configures a video summary. When the collected video summary is insufficient, a scalability module 32 eliminates the sphere which forms the outermost layer (as if peeling off the skin of an onion). When the fuzzy OC-SVM is applied to the residual characteristic vectors again, a sphere provided next to the outermost layer is obtained as shown in FIG. 3.

New support vectors are obtained from the new sphere, and a little further detailed summary information is obtained by adding the segments which correspond to the new support vectors to the first found video summary after checking the probable repetition between the video segment in the initial stage and the second added segment. The scalability module 32 can generate a scalable video summary by repeatedly eliminating the spheres starting from the sphere provided on the outermost layer until the original video segments are exhausted or until a predetermined condition is satisfied. These processes are summarized below.

Input: Segment data including importance information of $\beta$ and characteristic vectors Stage 1: Receive input data, establish C=1 of Math Figure 4, and find the value of a by quadratic programming.

Stage 2: Find a set of key frames of video segments which satisfy the condition of 0<a in Stage 1, and eliminate a corresponding characteristic vector from the input data.

Stage 3:

Case 1: Configure a VS (video summary) with the key frames obtained in Stage 2, and go to Stage 4 when entering the current loop for the first time.

Case 2: Repeatedly eliminate one key frame from the TS, and check whether a segment which belongs to the corresponding key frame and an adjacent segment (which is found from the divided original video) belong to the current VS, until the sequence TS of successive key frames arranged in the non-ascending order according to the importance $\beta$ of segments is eliminated when entering other than the first loop.

(1) Add the key frame eliminated from the TS to the VS in the case that the segments do not belong to the current VS.

(2) Add the key frame to the VS when the minimum similarity is below the threshold value in the case that the segments belong to the current VS.

Stage 4: Establish the support vector eliminated data in Stage 2 to be input data, and go to Stage 1. (In addition, go to Stage 1 and extract the key frames consecutively when a predefined termination condition is not satisfied, and terminate the process when the termination condition is satisfied.)

FIGS. 4 and 5 show simulation results generated by applying the fuzzy OC-SVM system for generating the video summary to the movie and music video.

As shown, major scenes with a fixed length according to a random threshold value are not generated, but the major scenes including more than 90% of important events in the video are configured through a several-times repeated process to thus generate the video summary.

The video summary generation method using the fuzzy one-class SVM described in the preferred embodiment considers the user's subjective importance on the segments and visual characteristics of the segments and extracts the optimized segment for describing contents of the given video, thereby greatly improving the conventional video summarization heavily dependent on the threshold value, finding the optimal threshold value appropriate for various video characteristics, and generating a suitable video summary.

The output unit 50 displays the generated video summary on the screen, and the storage unit 60 stores output information.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

The invention claimed is:

1. An automatic video summarizer comprising:
an input unit for receiving a video source to be summarized and a desired summarization time from a user;
an importance measurement module for generating importance degrees according to category characteristics of the video and a purpose of desired summary; and
a video summarization generation module for receiving shot information of the video source and a visual characteristic vector, and for applying a combination of the importance degrees, the shot information, and the visual characteristic vector to a fuzzy OC-SVM (one-class support vector machine) algorithm to generate a video summary,
wherein the video summarization generation module comprises a scalability processing module for receiving the summarization time information from the user, repeatedly performing a scalability process, and generating a video summary having a time range desired by the user.

2. The automatic video summarizer of claim 1, further comprising a shot detection module for extracting the shot information from the video source.

3. The automatic video summarizer of claim 1, comprising:
an output unit for outputting the generated video summary to a screen; and a storage unit
for storing the generated video summary.

4. The automatic video summarizer of claim 2, wherein the shot detection module detects a shot from the video source to be summarized, configures a shot list, and transmits the shot list to the video summarization generation module.

5. An automatic video summarization method comprising:
(a) receiving, by an automatic video summarizer, a video source to be summarized and a desired summarization time from a user;
(b) extracting, by the automatic video summarizer, shot information from the video source;
(c) generating, by the automatic video summarizer, importance degrees according to the video's category characteristic and a purpose of desired summary; and
(d) applying, by the automatic video summarizer, a combination of the shot information, the importance degrees, and a visual characteristic vector to a fuzzy OC-SVM (one-class support vector machine) algorithm to generate a video summary,
wherein the automatic video summarizer, in response to the summarization time information from the user, repeatedly performs a scalability process, and generates a video summary having a time range desired by the user.

6. The automatic video summarization method of claim 5, further comprising:
outputting the generated video summary to the screen; and
storing the generated video summary.

7. An automatic video summarization method comprising:
(a) receiving, by an automatic video summarizer, a video source to be summarized and a desired summarization time from a user;
(b) generating, by the automatic video summarizer, importance degrees according to the video s category characteristic and a purpose of desired summary;
(c) applying, by the automatic video summarizer, a combination of shot information of the video source, the importance decrees, and a visual characteristic vector to a fuzzy OC-SVM (one-class support vector machine) algorithm to generate a video summary;
(d) outputting, by the automatic video summarizer, the generated video summary to a screen; and
(e) storing, by the automatic video summarizer, the generated video summary,
wherein the automatic video summarizer, in response to the summarization time information from the user, repeatedly performs a scalability process, and generates a video summary having a time range desired by the user.

8. A recording medium storing a program for an automatic video summarization method, comprising:
receiving, by an automatic video summarizer, a video source to be summarized and a desired summarization time from a user;
extracting, by the automatic video summarizer, shot information from the video source;
generating, by the automatic video summarizer, importance degrees according to the video's category characteristic and a purpose of desired summary; and
applying, by the automatic video summarizer, a combination of the shot information, the importance degrees, and a visual characteristic vector to a fuzzy OC-SVM (one-class support vector machine) algorithm to generate a video summary,
wherein the automatic video summarizer, in response to the summarization time information from the user, repeatedly performs a scalability process, and generates a video summary having a time range desired by the user.

* * * * *